(12) United States Patent
Jung et al.

(10) Patent No.: US 12,512,535 B2
(45) Date of Patent: Dec. 30, 2025

(54) BATTERY CELL COMPRISING A POUCH CASE COMPRISING AN INSULATING COATING LAYER AND BATTERY MODULE INCLUDING THE SAME

(71) Applicant: LG Energy Solution, Ltd., Seoul (KR)

(72) Inventors: Kitaek Jung, Daejeon (KR); Junkyu Park, Daejeon (KR); Younggil Kim, Daejeon (KR); Jehwan Sin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 698 days.

(21) Appl. No.: 17/836,501

(22) Filed: Jun. 9, 2022

(65) Prior Publication Data
US 2022/0407153 A1    Dec. 22, 2022

(30) Foreign Application Priority Data

Jun. 17, 2021  (KR) .......................... 10-2021-0078942
Mar. 30, 2022  (KR) .......................... 10-2022-0039740

(51) Int. Cl.
*H01M 50/105*  (2021.01)
*H01M 50/124*  (2021.01)
(Continued)

(52) U.S. Cl.
CPC ....... *H01M 50/105* (2021.01); *H01M 50/124* (2021.01); *H01M 50/184* (2021.01);
(Continued)

(58) Field of Classification Search
CPC ............. H01M 50/186; H01M 50/124; H01M 50/184; H01M 50/59; H01M 2220/20
See application file for complete search history.

(56) References Cited

U.S. PATENT DOCUMENTS

2014/0370372 A1*  12/2014  Kong .................. H01M 50/186
429/185
2019/0393455 A1*  12/2019  Seo ....................... H01M 10/04
(Continued)

FOREIGN PATENT DOCUMENTS

KR    2010-0071814 A   *  6/2010
KR    101200470 B1      11/2012
(Continued)

OTHER PUBLICATIONS

EPO machine generated English translation of KR 2010-0071814 A (Year: 2010).*
(Continued)

*Primary Examiner* — Basia A Ridley
*Assistant Examiner* — Kimberly Wyluda
(74) *Attorney, Agent, or Firm* — Lerner David LLP

(57) ABSTRACT

The present disclosure relates to a battery cell and a battery module including the same. A battery cell according to one embodiment of the present disclosure includes an electrode assembly including a positive electrode, a negative electrode, and a separator; and a pouch case for housing the electrode assembly, wherein the pouch case includes an insulating fragile portion, which is a portion where insulation is fragile, and wherein an insulating coating layer is formed on the insulating fragile portion.

12 Claims, 9 Drawing Sheets

(51) Int. Cl.
H01M 50/184 (2021.01)
H01M 50/186 (2021.01)
H01M 50/59 (2021.01)

(52) U.S. Cl.
CPC ......... H01M 50/186 (2021.01); H01M 50/59 (2021.01); H01M 2220/20 (2013.01)

(56) References Cited

U.S. PATENT DOCUMENTS

| | | |
|---|---|---|
| 2020/0067029 A1 | 2/2020 | Park et al. |
| 2021/0028417 A1 | 1/2021 | Yim et al. |

FOREIGN PATENT DOCUMENTS

| | | | | |
|---|---|---|---|---|
| KR | 20130105578 A | | 9/2013 | |
| KR | 101408539 B1 | | 6/2014 | |
| KR | 2016-0079510 A | * | 7/2016 | |
| KR | 20160140554 A | * | 12/2016 | ........ H01M 10/0436 |
| KR | 101725879 B1 | | 4/2017 | |
| KR | 20180083123 A | | 7/2018 | |
| KR | 20190024755 A | | 3/2019 | |
| KR | 20200038134 A | | 4/2020 | |
| KR | 20200075362 A | | 6/2020 | |
| KR | 20210037460 A | | 4/2021 | |

OTHER PUBLICATIONS

EPO machine generated English translation of KR 2016-0079510 A (Year: 2016).*
EPO machine generated English translation of KR-20160140554-A (Year: 2016).*

* cited by examiner

[FIG. 1]
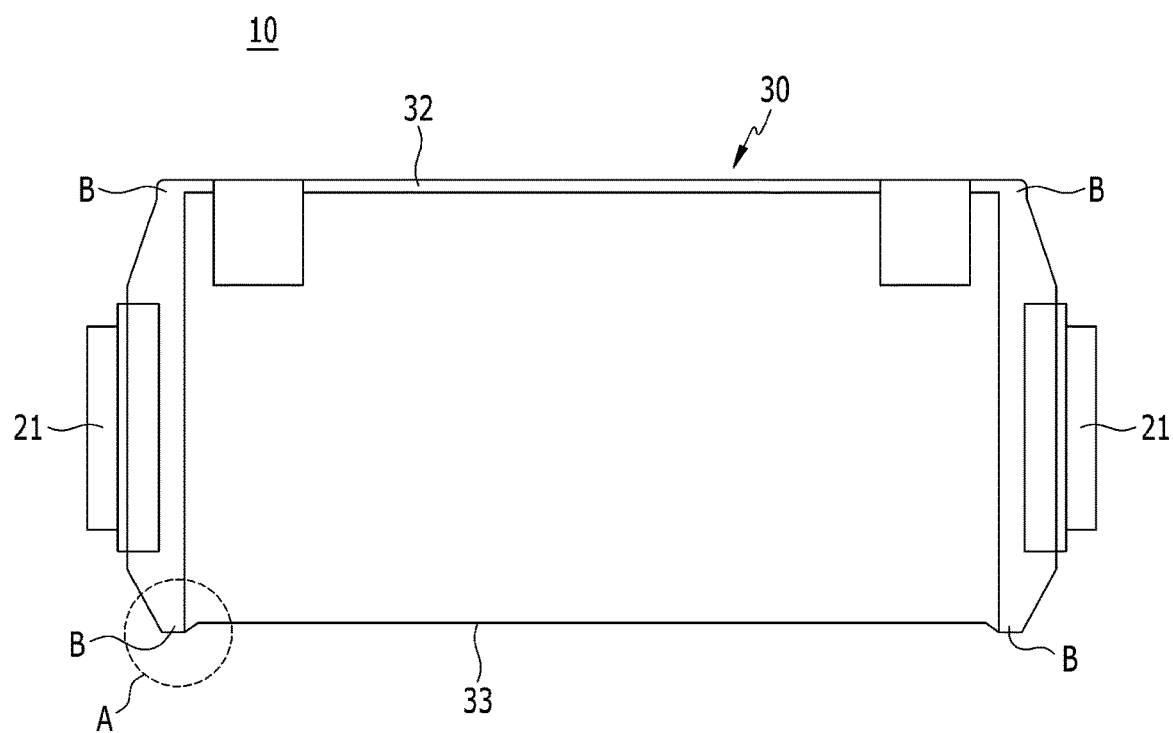

[FIG. 2]
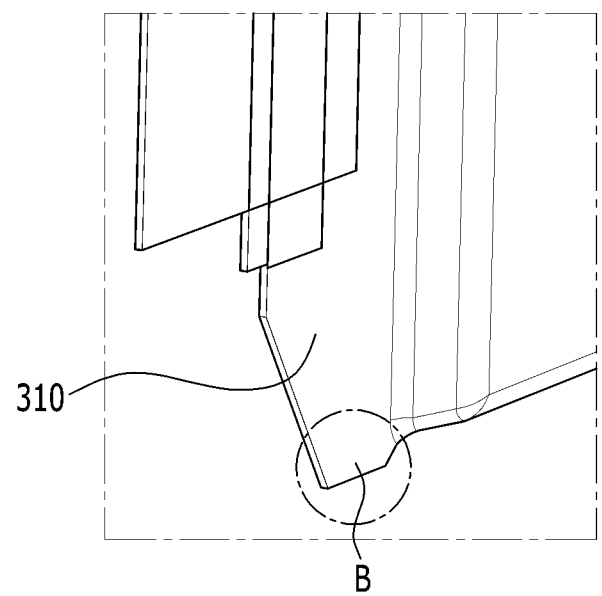

[FIG. 3]
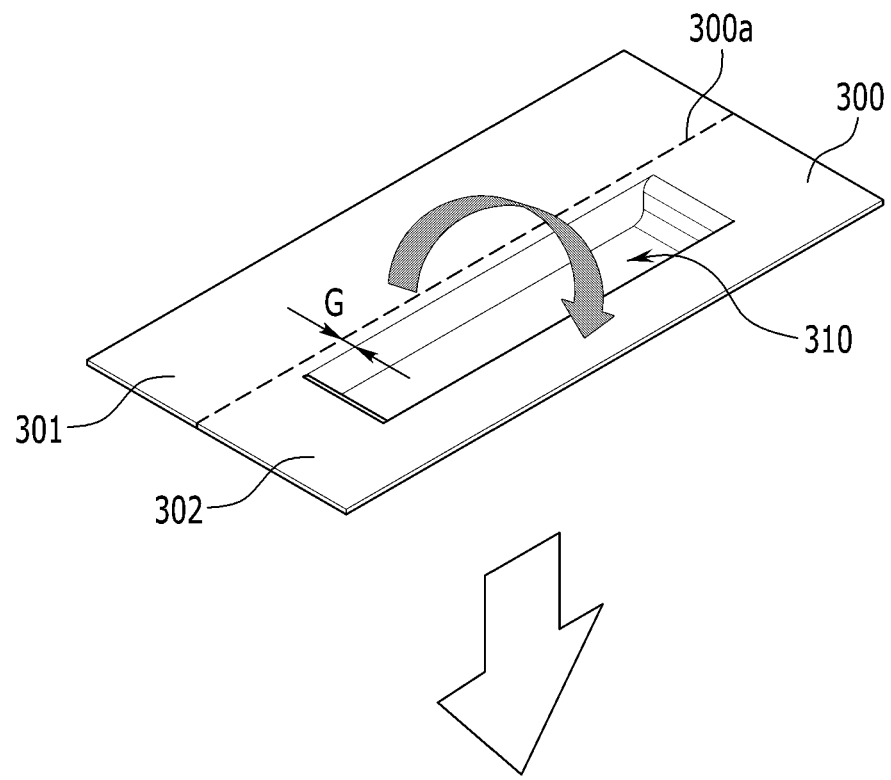
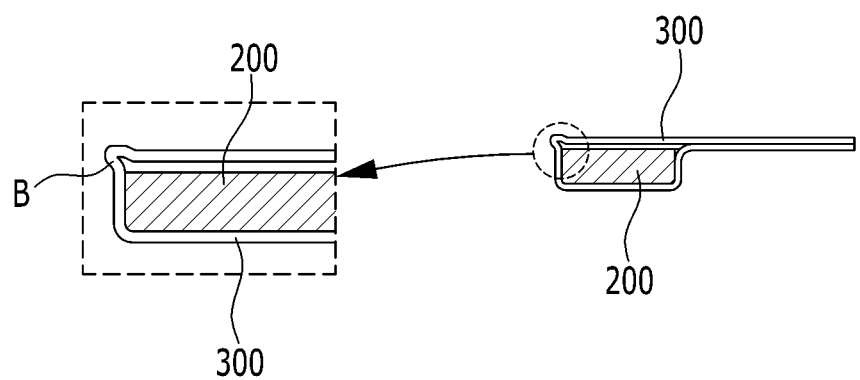

[FIG. 4]
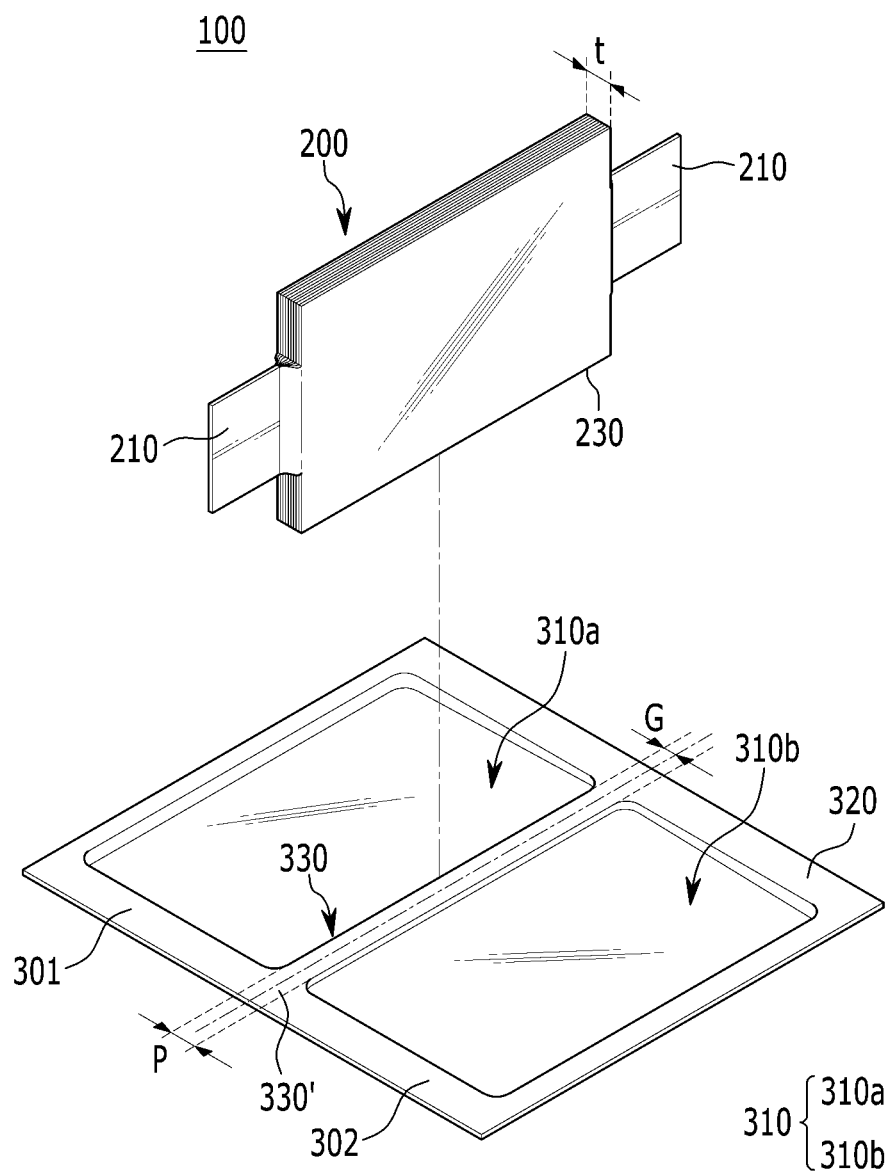

[FIG. 5]
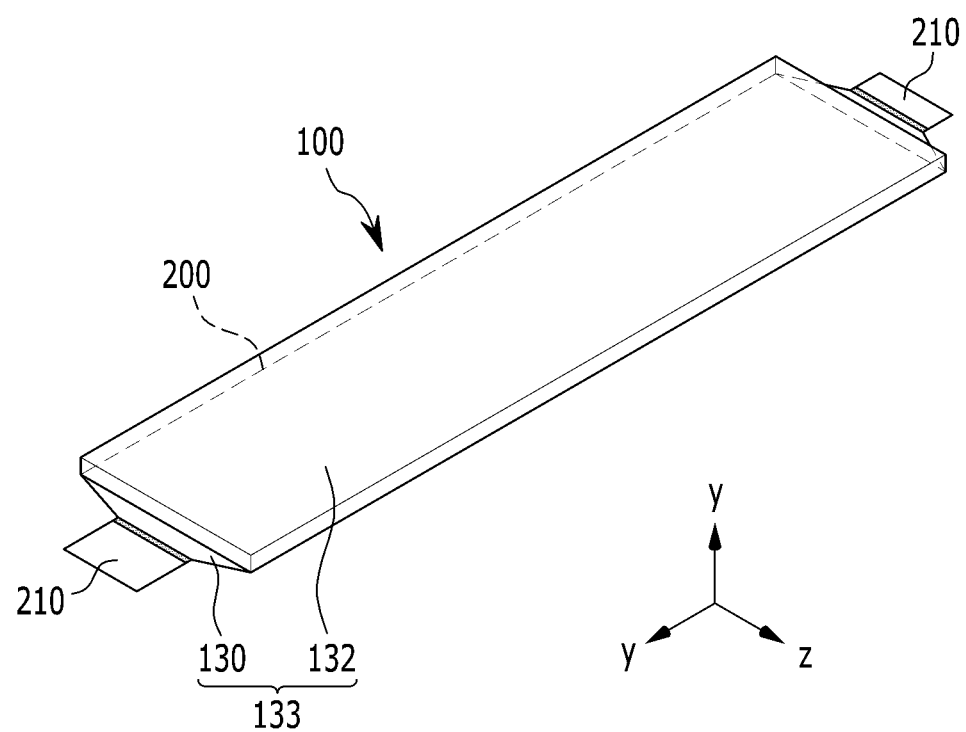

[FIG. 6]
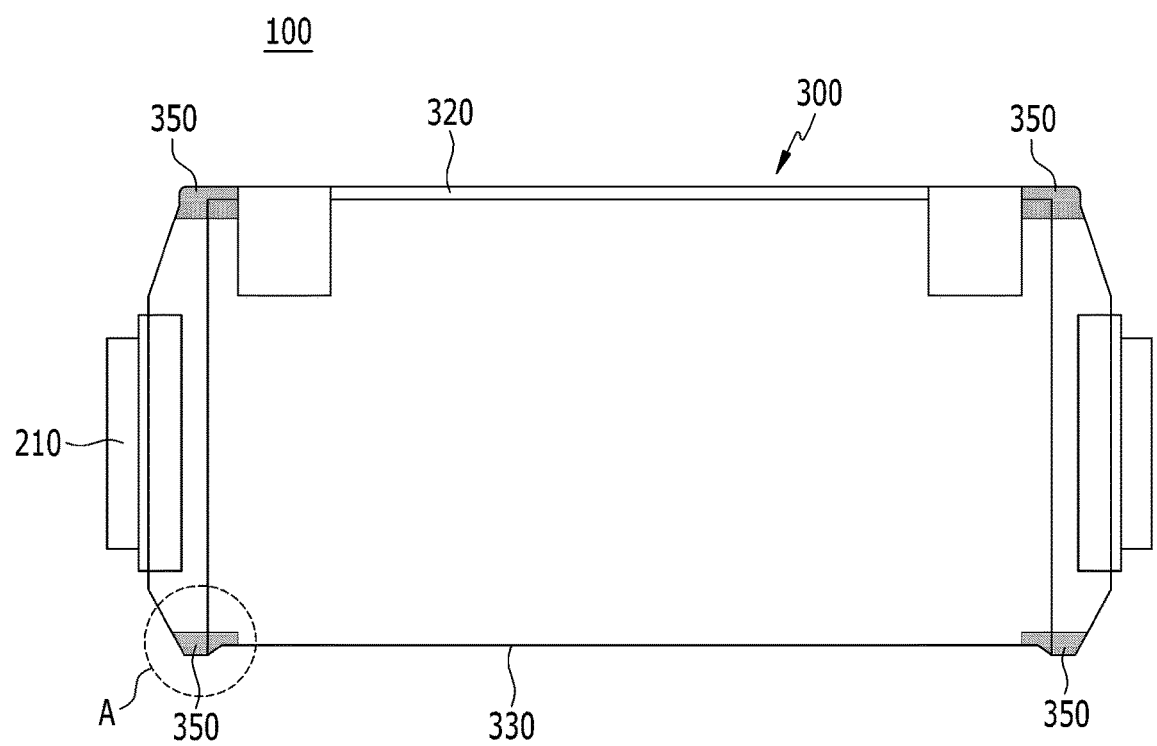

[FIG. 7]
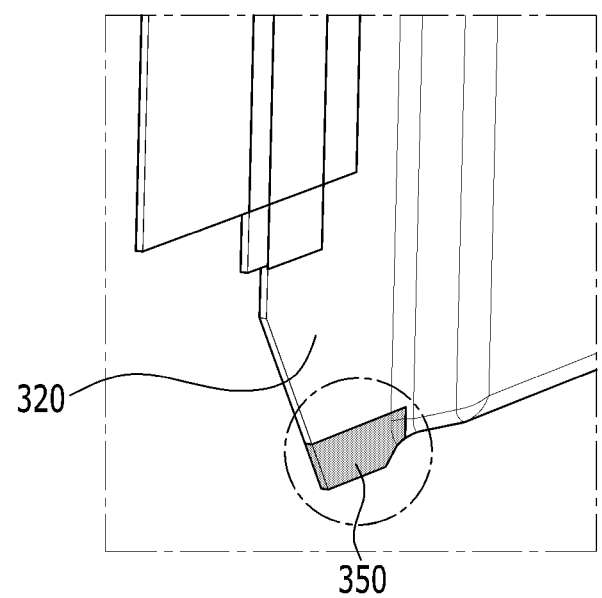

[FIG. 8]
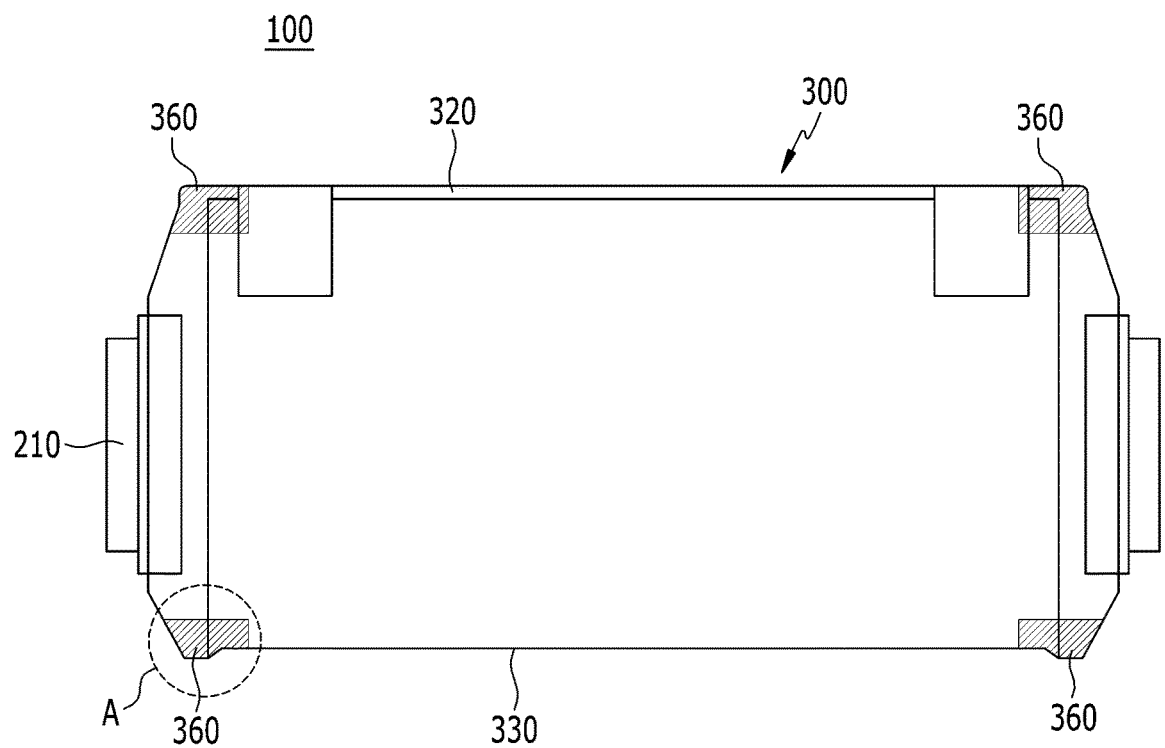

[FIG. 9]
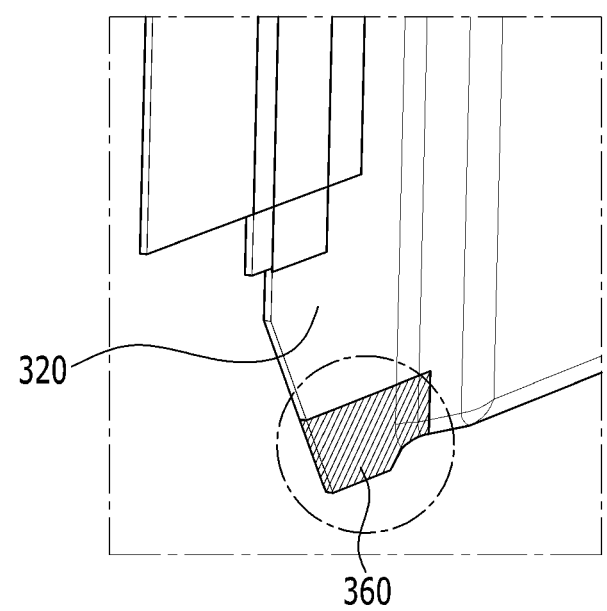

BATTERY CELL COMPRISING A POUCH CASE COMPRISING AN INSULATING COATING LAYER AND BATTERY MODULE INCLUDING THE SAME

CROSS-REFERENCE TO RELATED APPLICATIONS

The present application claims priority to Korean Patent Application Nos. 10-2021-0078942, filed on Jun. 17, 2021, and 10-2022-0039740, filed on Mar. 30, 2022, the disclosures of which are hereby incorporated by reference herein in their entireties.

TECHNICAL FIELD

The present disclosure relates to a battery cell and a battery module including the same, and more particularly, to a pouch type battery cell and a battery module.

BACKGROUND

Along with the increase of the technological development and demand for a mobile device, demand for a secondary battery as an energy source is increasing rapidly, and accordingly, many researches on the battery capable of meeting various demands are being performed.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series or in parallel to configure a battery pack, a method of configuring a battery module composed of at least one battery cell and then adding other components to at least one battery module to configure a battery pack is common.

FIG. 1 is a diagram showing a conventional battery cell. FIG. 2 is a diagram showing a section A of FIG. 1 as viewed from another direction.

Referring to FIGS. 1 and 2, the battery cell 10 is a secondary battery and may be configured as a pouch-type secondary battery. Such a battery cell 10 may include an electrode assembly 20 including a positive electrode, a negative electrode, and a separator, a pouch case 30, and an electrode lead 21 protruding from the electrode assembly 20.

The pouch case 30 is folded along the folding portion 33 in a state where the electrode assembly 20 is housed, and then when the sealing portion 32 is compressed and heat-fused, a bur-shaped protrusion portion called a bat-ear may be formed in the direction toward the outside of the electrode assembly 20 due to residual stress. Such a bat-ear-shaped protrusion portion may be a region of the pouch case 30 in which insulation is fragile, and the region of the pouch case 30 in which insulation is fragile including the bat-ear-shaped protrusion portion may be referred to as an insulating fragile portion B. The insulating fragile portion B is not limited to the bat-ear-shaped protrusion portion, and in the process of forming the battery cell 10, fine cracks or the like occur due to a sudden change in the shape of the pouch case 30, and thus it may also include a portion where the pouch case 30 is easily broken. The presence of such an insulating fragile portion B makes the insulation of the battery cell 10 fragile, and the function of protecting the battery cell 10 against physical changes from the outside cannot be performed, so that the performance and lifespan of the secondary battery can be reduced.

Therefore, there is a need to strengthen the insulation performance of the secondary battery and thus improve the efficiency and lifespan of the secondary battery.

DETAILED DESCRIPTION OF THE INVENTION

Technical Problem

It is an object of the present disclosure to provide a battery cell having improved insulation performance and lifespan, and a battery module including the same.

However, the technical problem to be solved by embodiments of the present disclosure is not limited to the above-described problems, and can be variously expanded within the scope of the technical idea included in the present disclosure.

Technical Solution

According to one aspect of the present disclosure, there is provided a battery cell comprising: an electrode assembly including a positive electrode, a negative electrode, and a separator; and a pouch case for housing the electrode assembly, wherein the pouch case includes an insulating fragile portion, which is a portion where insulation is fragile, and wherein an insulating coating layer is formed on the insulating fragile portion.

The pouch case may include a sealing portion and a folding portion respectively formed at the corners of the pouch case, and at least one of the sealing portion and the folding portion comprises the insulating fragile portion.

The insulating fragile portion may include a region where the sealing portions respectively formed at mutually adjacent corners of the pouch case intersect with each other.

The insulating fragile portion may include a region where the sealing portion and the folding portion respectively formed at mutually adjacent corners of the pouch case intersect with each other.

The pouch case includes a first region and a second region corresponding to each other, and the sealing portion is sealed by joining edges of the first region and the second region to each other in a state where the electrode assembly is housed.

The pouch case includes a first region and a second region corresponding to each other, and the folding portion may be folded so that the first region and the second region face each other.

The battery cell may further include a protrusion portion that protrudes in a direction perpendicular to a thickness direction of the electrode assembly at a portion where the sealing portion and the folding portion intersect with each other.

The protrusion portion may be a bur having a bat-ear shape.

The insulating coating layer may be configured such that an insulating material for the purpose of insulating protection is subjected to conformal coating onto the insulating fragile portion.

The insulating coating layer may be formed in a region where the sealing portions respectively formed at mutually adjacent corners of the pouch case intersect with each other, and a region where the sealing portion and the folding portion respectively formed at mutually adjacent corners of the pouch case intersect with each other.

The insulating coating layer may be formed so as to correspond to the area of the insulating fragile portion.

The insulating coating layer may include an organic coating agent.

The insulating material may include at least one of acrylic, silicone, urethane, and epoxy.

A plurality of the insulating coating layers may be formed so as to be spaced apart from each other.

The battery cell may further include an insulating coating protective layer formed so as to cover the insulating coating layer on the outside of the insulating coating layer.

The insulating coating protective layer may be formed in a region where the sealing portions respectively formed at mutually adjacent corners of the pouch case intersect with each other, and a region where the sealing portion and the folding portion respectively formed at mutually adjacent corners of the pouch case intersect with each other.

According to another aspect of the present disclosure, there is provided a battery module comprising the above-mentioned battery cell.

Advantageous Effects

According to embodiments of the present disclosure, the coating layer is formed on the insulating fragile portion of the battery cell, thereby being able to improve the insulation performance and lifespan of the battery cell.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a conventional battery cell;

FIG. 2 is a diagram showing a section A of FIG. 1 as viewed from another direction;

FIG. 3 is a diagram showing a manufacturing process of a battery cell according to an embodiment of the present disclosure;

FIG. 4 is a diagram showing an exploded state of an assembling step of a battery cell according to an embodiment of the present disclosure;

FIG. 5 is a perspective view of a battery cell according to an embodiment of the present disclosure;

FIG. 6 is a diagram showing a battery cell according to an embodiment of the present disclosure;

FIG. 7 is a diagram showing a section A of FIG. 6 as viewed from another direction;

FIG. 8 is a diagram showing a battery cell according to another embodiment of the present disclosure; and FIG. 9 is a diagram showing a section A of FIG. 8 as viewed from a different direction.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

A description of parts not related to the description will be omitted herein for clarity, and same reference numerals designate same or like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is a diagram showing a manufacturing process of a battery cell according to an embodiment of the present disclosure. FIG. 4 is a diagram showing an exploded state of an assembling step of a battery cell according to an embodiment of the present disclosure. FIG. 5 is a perspective view of a battery cell according to an embodiment of the present disclosure.

Referring to FIGS. 3 to 5, the battery cell 100 inserted so as to be stacked on the battery module includes an electrode assembly 200 including a positive electrode, a negative electrode and a separator, and a pouch case 300 in which a housing portion 310 for housing the electrode assembly 200 is formed.

The electrode assembly 200 may be a stack type electrode assembly 200 in which a plurality of positive and negative electrodes cut in units of a predetermined size are sequentially stacked with a separator interposed therebetween. However, the present disclosure is not limited thereto and it may be a winding type assembly having a structure in which a positive electrode, a negative electrode and a separator interposed therebetween are wound.

The electrode lead 210 can be electrically connected to the electrode assembly 200. Such electrode leads 210 may be formed in a pair. A part of the pair of electrode leads 210 may protrude to the outside of the pouch case 300 at the front and rear directions of the pouch case 300 (both ends in the longitudinal direction of the electrode assembly), respectively. The configuration of the battery cell 100 described above is an example, and the shape of the battery cell 100 may be variously modified.

The pouch case 300 may include a housing portion 310, a sealing portion 320 and a folding portion 330. The pouch case 300 may include a first region 301 and a second region 302 corresponding to each other, and may be made of a sheet-like base material including a first housing portion 310a located in the first region 301, a second housing portion 310b located in the second region 302, and a folding portion 330 located between the first housing portion 310a and the second housing portion 310b.

The first region 301 and the second region 302 may be divided by a bending line 330' of the pouch case 300. At this time, the bending line 330' of the pouch case 300 may be formed in a portion spaced apart (G) from the edge line of the housing portion 310.

At the time of manufacturing the pouch case 300, a housing portion 310 in which the electrode assembly 200 is housed may be formed in at least one of the first region 301 and the second region 302 through forming. The housing portion 310 may include a first housing portion 310a located in the first region 301 and a second housing portion 310b located in the second region 302. A part of the electrode assembly 200 is incorporated into each of the first housing portion 310a and the second housing portion 310b, and the electrode assembly 200 can be housed so as to be wrapped by folding the first housing portion 310a and the second housing portion 310b so as to face each other with the folding portion 330 interposed therebetween.

After the housing portion 310 is formed, the structure of the pouch case 300 can be completed by bending the folding portion 330 of the pouch case 300 by 180 degrees with respect to the bending line 330' and covering the housing portion 310.

The folding portion 330 may be a portion that bends the pouch case 300 while including the bending line 330'. The first region 301 and the second region 302 may be in contact with each other while being folded along the folding portion 330.

The electrode assembly 200 has a planar shape having four sides, and the folding portion 330 may be located at a portion corresponding to one of the four sides. The folding portion 330 is in close contact with the side surface 230 of the electrode assembly 200, so that the sheet-shaped base material is folded at both edges of the folding portion 330, whereby the first housing portion 310a and the second housing portion 310b can be folded to face each other. Therefore, the width P of the folding portion 330 may be the same as the thickness t of the electrode assembly 200. On three sides excluding the sides corresponding to the folding portion 330, the edges of the first housing portion 310a and the second housing portion 310b are joined and sealed to each other to form a sealing portion 320. The sealing portion 320 is sealed by a method such as heat-sealing.

In more detail, the sheet-like base material of the pouch case 300 may be formed of a laminated sheet including a metal layer and a resin layer. In particular, the laminated sheet may be an aluminum laminate sheet. The sheet-like base material includes a core made of a metal layer, a heat-sealing layer formed on one surface of the core, and an insulating film formed on the other surface of the core. The heat sealing layer acts as an adhesive layer using a polymer resin, such as modified polypropylene, for example, CPP (Casted Polypropylene), and the insulating film may be formed of a resin material such as nylon or polyethylene terephthalate (PET), but the structure and material of the pouch exterior material are not limited. In the sealing portion 320, the heat-sealing layer of the first housing portion 310a and the second housing portion 310b comes into contact with each other, and a heat-sealing process is performed in a state where these are in contact with each other, so that the pouch case 300 is sealed.

In the process of sealing using the sheet-like base material in this way, at the portion where the folding portion 330 and the sealing portion 320 intersect with each other (section A in FIG. 1), a portion protruding to the outside of one side of the electrode assembly 200 on which the folding portion 330 is formed while the sheet-like base material is pressed may be generated. Such a protruding portion may be an insulating fragile portion B. At least one of the sealing portion 320 and the folding portion 330 may include an insulating fragile portion B.

The insulating fragile portion B may be respectively formed at mutually adjacent corners of the pouch case 300. The insulating fragile portion B may include a point at which the sealing portions 320 respectively formed at mutually adjacent corners of the pouch case 300 intersect with each other. The insulating fragile portion B may be a protrusion portion that protrudes in a direction perpendicular to the thickness t direction of the electrode assembly 200 at a portion where the sealing portion 320 and the folding portion 330 intersect with each other. As shown in FIG. 1, the insulating fragile portion B may be a bat-ear-shaped bur in which the folding portion of the bending line 300a adjacent to the edge line is not smoothly formed and protrudes outward. However, the insulating fragile portion B is not limited thereto, and according to a sudden change in shape due to forming or sealing of the pouch case 300, the pouch case 300 becomes thin or cracks occur, and thus any portion can be included as long as it is a portion where insulation becomes fragile.

Next, the configuration of one battery cell 110 will be described with reference to FIG. 5. The battery cell 100 may include an electrode assembly 200, a cell case 133, and an electrode lead 210 protruding from the electrode assembly 200, respectively.

The electrode assembly 200 an be composed of a positive electrode plate, a negative electrode plate, and a separator. The cell case 133 is for packaging the electrode assembly 200, and can be composed of a laminated sheet including a resin layer and a metal layer. Such a cell case 133 may include a case main body 132 and a cell terrace 130. The case main body 132 may house the electrode assembly 200. For this purpose, the case main body 132 is provided with a housing space capable of housing the electrode assembly 200. The cell terrace 130 extends from the case main body 132 and is sealed so as to seal the electrode assembly 200. The electrode leads 210 may partially protrude from one side and the other side of the cell terrace 130, specifically, in the front and rear directions (y-axis direction) of the cell terrace 130.

The electrode lead 210 can be electrically connected to the electrode assembly 200. Such electrode leads 210 may be formed in a pair. A part of the pair of electrode leads 210 may protrude out of the cell terrace 130 in front and rear (y-axis direction) of the cell case 133, respectively. The configuration of the battery cell 100 described above is an example, and the shape of the battery cell 100 for configuring the battery cell stack may be variously modified.

FIG. 6 is a diagram showing a battery cell according to an embodiment of the present disclosure. FIG. 7 is a diagram showing a section A of FIG. 6 as viewed from another direction.

Referring to FIGS. 6 to 7, the battery cell 100 according to an embodiment of the present disclosure may include an insulating coating layer 350 formed on the insulating fragile portion B. The insulating coating layer 350 may be a layer on which insulating coating is further performed in addition to the insulating layer provided in the pouch case 300. The figure shows that the insulating coating layer 350 is formed only on one region of the edge of the battery cell 100 and the bat-ear-shaped protrusion portion, but is not limited thereto. The insulating coating layer 350 may be formed anywhere in the insulating fragile portion B. Therefore, the insulating coating layer 350 may be formed in only one number, or may be formed in plural numbers so as to be spaced apart from each other.

Specifically, the insulating coating layer 350 may be formed in a region where the sealing portions 320 respectively formed at mutually adjacent corners of the pouch case intersect with each other, or in a region where the sealing portion 320 and the folding portion 330 respectively formed at mutually adjacent corners of the pouch case intersect with each other. The insulating coating layer 350 may be formed on a protrusion portion that protrudes in a direction perpendicular to the thickness direction of the electrode assembly 200 at a portion where the sealing portion 320 and the folding portion 330 intersect with each other.

The insulation coating layer 350 is formed by coating the insulating fragile portion B located in the pouch case 300 of the battery cell 100 with an insulation material for the purpose of insulating protection, whereby the electrical connection between the electrode assembly 200 mounted inside the pouch case 300 and the outside can be cut off, and the battery cell 100 can be protected from physical influences such as external humidity and contamination, so that the lifespan of the battery can be maintained for a long time.

The insulating coating layer 350 may be formed by conformal coating. The conformal coating is the formation of a coating film with a very thin thickness to protect it from external environmental and physical influences.

According to an embodiment of the present disclosure, the coating agent forming the insulating coating layer 350 may be an organic coating agent. The coating agent forming the insulating coating layer 350 is not limited as long as it includes an insulating material, and for example, it may be an acrylic, silicone, urethane, and epoxy material. The insulating coating layer 350 formed of silicone and epoxy material is resistant to high temperature, and the insulating coating layer 350 formed of a urethane material has excellent chemical resistance, and the insulating coating layer 350 formed of an acrylic material has a characteristic of being strong in electrical resistance.

The insulating coating layer 350 may be formed through a method such as paint brushing, spray coating, or dip coating. Preferably, the insulating coating layer 350 may be formed through paint brushing and dipping.

The insulating coating layer 350 may have a thickness of at least 2 times to at most 10 times the thickness of the insulating layer provided in the pouch case 300. Further, the coating area of the insulating coating layer 350 may be at least 100% of the area of the insulating fragile portion B. Specifically, the insulating coating layer 350 may be formed so as to correspond to the area of the insulating fragile portion B covered by the insulating coating layer 350, and may also be formed while covering the insulating fragile portion B over the area of the insulating fragile portion B.

By forming the insulating coating layer 350 on the insulating fragile portion B, the insulation performance of the battery cell 100 can be secured. Further, since it is not necessary to insert a separate component for insulation, the energy density of the battery cell and the battery module including the same can be improved, the assembling property can be improved, and the cost associated with the assembling can be reduced.

FIG. 8 is a diagram showing a battery cell according to another embodiment of the present disclosure. FIG. 9 is a diagram showing a section A of FIG. 8 as viewed from a different direction.

Referring to FIGS. 8 and 9, the battery cell according to another embodiment of the present disclosure may further include an insulating coating protective layer 360 formed so as to cover the insulating coating layer 350 from the outside of the insulating coating layer 350. The insulating coating protective layer 360 may be formed at a position corresponding to the insulating coating layer 350. Therefore, the insulating coating protective layer 360 may be formed in only one number, or may be formed in plural numbers so as to be spaced apart from each other.

Specifically, the insulating coating protective layer 360 may be formed in a region where the sealing portions 320 respectively formed at mutually adjacent corners of the pouch case intersect with each other, or a region where the sealing portion 320 and the folding portion 330 respectively formed at mutually adjacent corners of the pouch case intersect with each other. The insulating coating protective layer 360 may formed at a protrusion portion that protrudes in a direction perpendicular to the thickness direction of the electrode assembly 200 at a portion where the sealing portion 320 and the folding portion 330 intersect with each other.

The insulating coating protective layer 360 may be formed in a wider area than the area where the insulating coating layer 350 is located.

The coating area of the insulating coating protective layer 360 may be at least 100% of the area of the insulating coating layer 350. Specifically, the insulating coating protective layer 360 may be formed so as to correspond to the area of the insulating coating layer 350 covered by the insulating coating protective layer 360, and may be formed while covering the insulating coating layer 350 over an area of the insulating coating layer 350. The insulating coating protective layer 360 is formed by coating a coating agent to protect the insulating coating layer 350 located in the pouch case 300 of the battery cell 100. When the battery cell 100 is stacked and housed in the battery module, it is possible to protect the insulating coating layer 350 from friction with parts, and to secure the insulating performance of the battery cell 100 and the battery module including the same. The insulating performance of the battery module can be further strengthened through the insulating performance of the insulating coating protective layer itself.

The above-mentioned battery cell and the battery module including the same can be applied to various devices. Such a device may be applied to a vehicle means such as an electric bicycle, an electric vehicle, or a hybrid vehicle, but the present disclosure is not limited thereto, and is applicable to various devices that can use a battery cell and the battery module including the same, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

100: battery cell
200: electrode assembly
210: electrode lead
300: pouch case
310: housing portion
320: sealing portion 330: folding portion
350: insulating coating layer
360: insulating coating protective layer
B: insulating fragile portion

The invention claimed is:

1. A battery cell comprising:
an electrode assembly including a positive electrode, a negative electrode, and a separator; and
a pouch case housing the electrode assembly therein, the pouch case having a sealing portion and a folding portion, the sealing portion including corners of the pouch case, the folding portion extending between two adjacent ones of the corners,
wherein the pouch case includes an insulating fragile portion in a region in which the sealing portion and the folding portion overlap, the insulating fragile portion being a deformed part of an insulating layer of the pouch case that is thinner than an adjacent non-deformed part of the insulating layer,
wherein the insulating fragile portion includes a protrusion portion that protrudes away from the electrode assembly in a direction perpendicular to a thickness direction of the electrode assembly, and
wherein an insulating coating layer is formed only in or adjacent to a region of the sealing portion at adjacent corners of the pouch case, and only at or adjacent to a region in which the sealing portion and the folding portion overlap.

2. The battery cell of claim 1, wherein the insulating fragile portion comprises a region of the sealing portion at adjacent corners of the pouch case.

3. The battery cell of claim 1, wherein the pouch case comprises a first region and a second region facing each other, and the sealing portion comprises joined edges of the first region and the second region, the electrode assembly being housed within the first region and the second region.

4. The battery cell of claim 1, wherein the pouch case comprises a first region and a second region facing each other, and the folding portion is a folded region extending between the first region and the second region.

5. The battery cell of claim 1, wherein the protrusion portion is a bur having a bat-ear shape that is a protruding shape.

6. The battery cell of claim 1, wherein the insulating coating layer is an insulating material configured to provide insulating protection, and the insulating coating layer is a conformal coating deposited onto the insulating fragile portion.

7. The battery cell of claim 6, wherein the insulating coating layer is coincident with an area of the insulating fragile portion.

8. The battery cell of claim 6, wherein the insulating coating layer comprises an organic coating agent.

9. The battery cell of claim 6, wherein the insulating material comprises at least one of acrylic, silicone, urethane, or epoxy.

10. The battery cell of claim 1, further comprising an insulating coating protective layer covering the insulating coating layer on an outside surface of the insulating coating layer.

11. The battery cell of claim 10, wherein the insulating coating protective layer is formed in a region of the sealing portion at adjacent corners of the pouch case, and a region in which the sealing portion and the folding portion overlap.

12. A battery module comprising the battery cell of claim 1.

* * * * *